US012172621B2

(12) United States Patent
Haag et al.

(10) Patent No.: US 12,172,621 B2
(45) Date of Patent: Dec. 24, 2024

(54) METHOD AND DEVICE FOR OPERATING A BRAKE SYSTEM AND A VEHICLE HAVING THE BRAKE SYSTEM

(71) Applicant: Robert Bosch GmbH, Stuttgart (DE)

(72) Inventors: Florian Haag, Ellhofen (DE); Martin Marquart, Reichenbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 575 days.

(21) Appl. No.: 17/292,913

(22) PCT Filed: Jan. 17, 2020

(86) PCT No.: PCT/EP2020/051119
§ 371 (c)(1),
(2) Date: May 11, 2021

(87) PCT Pub. No.: WO2020/152048
PCT Pub. Date: Jul. 30, 2020

(65) Prior Publication Data
US 2021/0402968 A1 Dec. 30, 2021

(30) Foreign Application Priority Data

Jan. 24, 2019 (DE) .................... 10 2019 200 876.3

(51) Int. Cl.
*B60T 8/92* (2006.01)
*B60T 7/04* (2006.01)
(Continued)

(52) U.S. Cl.
CPC ............... *B60T 8/92* (2013.01); *B60T 7/042* (2013.01); *B60T 7/06* (2013.01); *B60T 8/885* (2013.01);
(Continued)

(58) Field of Classification Search
None
See application file for complete search history.

(56) References Cited

U.S. PATENT DOCUMENTS

2016/0209841 A1   7/2016  Yamaoka et al.
2016/0339880 A1*  11/2016 Svensson .............. B60W 30/09

FOREIGN PATENT DOCUMENTS

DE    102009033097 A1    2/2011
DE    102016208217 A1    11/2016
(Continued)

OTHER PUBLICATIONS

Gretel Png, "Terahertz Spectroscopy and Modelling of Biotissue", Jun. 2010, Ph.D. Thesis, The University of Adelaide, Australia (Year: 2010).*

(Continued)

*Primary Examiner* — Hongye Liang
(74) *Attorney, Agent, or Firm* — NORTON ROSE FULBRIGHT US LLP; Gerard A. Messina

(57) ABSTRACT

A method for operating a brake system of a vehicle, in particular, of a motor vehicle. The brake system includes at least one electric actuator, in particular, a brake booster, which may be driven to generate a braking force, the actuator being controllable by an autonomous driving system, and as a function of manipulation of a brake pedal of the vehicle; and an emergency braking action being initiated, when the actuator is driven both by the autonomous driving system and by manipulation of a brake pedal. The control by the autonomous driving system is superimposed with a varying validation signal, a differential travel between an actuator element of the actuator and the brake pedal is monitored, and the driving of the actuator via manipulation of the brake pedal during the control by the autonomous driving system is detected, if the differential travel varies.

6 Claims, 2 Drawing Sheets

(51) Int. Cl.
*B60T 7/06* (2006.01)
*B60T 8/88* (2006.01)
*B60T 13/74* (2006.01)

(52) U.S. Cl.
CPC ....... *B60T 13/745* (2013.01); *B60T 2270/413* (2013.01)

(56) References Cited

FOREIGN PATENT DOCUMENTS

| | | |
|---|---|---|
| DE | 102016007187 A1 | 6/2017 |
| DE | 102016221436 A1 | 12/2017 |
| DE | 102016213645 A1 | 2/2018 |
| DE | 102017209892 A1 | 12/2018 |
| EP | 3045369 A1 | 7/2016 |
| GB | 2443921 A | 5/2008 |
| WO | 2015188958 A1 | 12/2015 |

OTHER PUBLICATIONS

International Search Report for PCT/EP2020/051119, Issued May 4, 2020.

* cited by examiner

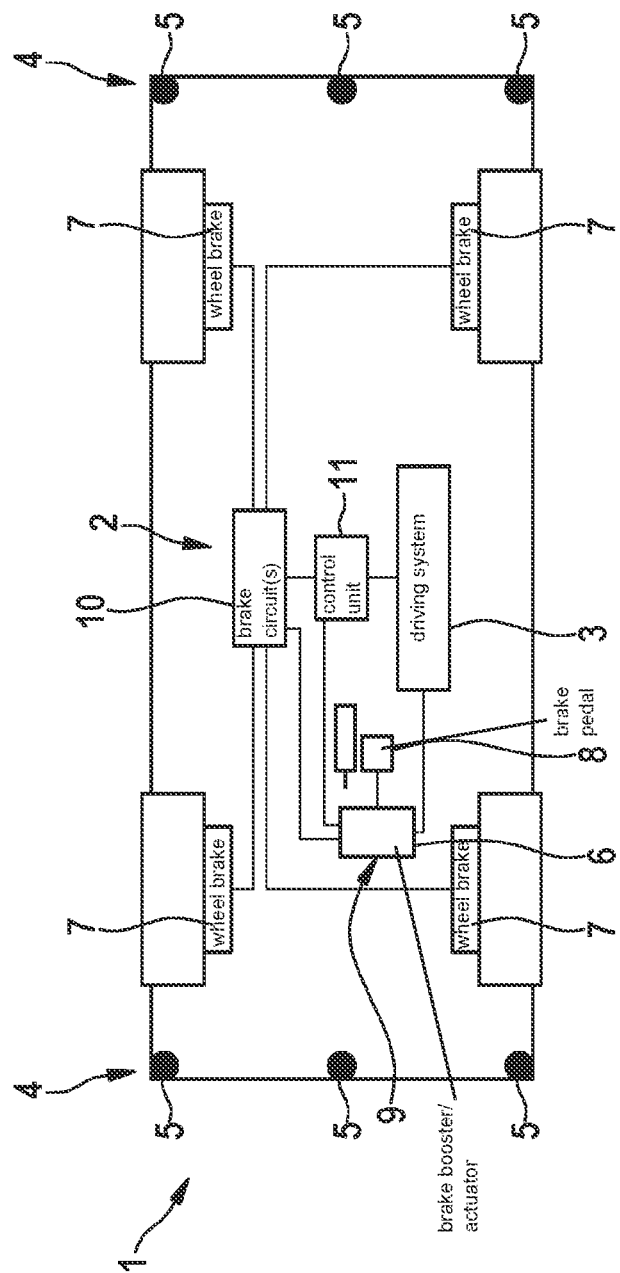

METHOD AND DEVICE FOR OPERATING A BRAKE SYSTEM AND A VEHICLE HAVING THE BRAKE SYSTEM

FIELD

The present invention relates to a method for operating a brake system of a vehicle, in particular, of a motor vehicle; the brake system including at least one electric actuator, in particular, brake booster, which may be driven to generate a braking force; the actuator being controllable by an autonomous driving system, and as a function of manipulation of a brake pedal of the vehicle; and an emergency braking action being initiated, when the actuator is driven both by the autonomous driving system and by manipulation of a brake pedal.

In addition, the present invention relates to a device for operating such a brake system, to a brake system, as well as to a vehicle having such a brake system.

BACKGROUND INFORMATION

Methods of the type mentioned above are available in the related art. Safety brake systems allow autonomously initiated, emergency braking actions, which take effect, for example, if a hazard has been detected by a surround-sensor system, but not, or not yet, by a driver of the vehicle. Thus, it is conventional, for example, that the distance from the vehicle to a vehicle traveling ahead or to other objects may be monitored with the aid of a sensor system, in order to initiate emergency braking in response to detection of an imminent crash. For the emergency braking, a brake pressure as high as possible is built up in as short a time as possible. In modern motor vehicles, which have an electromechanical brake booster, the brake pressure is built up by controlling the brake booster electrically. In this context, this may also result in the brake pedal's being displaced without the assistance of the driver. During braking carried out autonomously with the aid of the brake booster, at or above a certain differential travel between the brake pedal and an actuator element of the brake booster, which is caused by a mechanical catch, the brake pedal is pulled along by the brake booster, that is, by the actuator element, for example, a piston. To that end, the brake booster includes the movably supported actuator element, which increases the braking force or the brake pressure due to its displacement and is coupled or connectible mechanically to the brake pedal by the mechanical catch. In order to prevent an emergency braking action from being initiated unnecessarily, it is known that this may only be initiated, when the driver manipulates the brake pedal, as well. Thus, the manipulation of the brake pedal is utilized to check the plausibility of the necessity of emergency braking. This also makes it necessary to detect manipulation of the brake pedal by the driver during an emergency braking action and/or during the driving of the actuator by the autonomous driving system. To this end, the difference between the travel of the brake pedal and the travel of the actuator element is measured as the differential travel. If the driver manipulates the brake pedal, the brake travel limited by the mechanical catch is changed. This detected change is used for detecting manipulation of the brake pedal and, therefore, for initiating or enabling the emergency braking action.

SUMMARY

A method of an example embodiment of the present invention may have the advantage that improved detection of the manipulation of the brake pedal is ensured, which is more robust with regard to mechanical tolerances of the brake system and, due to this, also detects manipulation of the brake pedal by the driver in a very small differential-travel range. To this end, according to the present invention, the control by the autonomous driving system is superimposed with a varying validation signal, the differential travel between an actuator element of the actuator and the brake pedal is monitored, and the driving of the actuator due to manipulation of the brake pedal is detected during the control by the autonomous driving system, if the differential travel varies. As long as the user does not manipulate the brake pedal, the actuator is driven solely by the driving system. Due to the mechanically limited, maximum differential travel, this remains at a constant value, if the user does not manipulate the brake pedal. The validation signal, which is superimposed on the driving of the actuator, results in a predefined, constant value, by which the differential travel may not be affected, when the mechanical catch is already reached. However, as soon as the driver manipulates the brake pedal and, due to this, changes, in particular, reduces, the differential travel, then, on the basis of the varying validation signal, the differential travel is now correspondingly affected by the varying of the validation signal. Consequently, the presence of the validation sign is detectable in the differential travel. This ensures reliable detection of the manipulation of the brake pedal. As soon as the differential travel is nonuniform during the control by the driving system, this means that the driver has manipulated the brake pedal, as well, and that the mechanical catch of the system has been exited. Thus, the activation of the emergency braking of the autonomous driving system has been reliably checked for plausibility.

According to a preferred further refinement of the present invention, the validation signal is selected in such a manner, that it differs from a time characteristic of brake-pedal manipulation. In particular, the validation signal is selected in such a manner, that it may not be reproduced by manipulation of the brake pedal. This ensures unequivocal differentiation of the validation signal acting upon the differential travel, from manipulation of the brake pedal.

In addition, it is preferable for the validation signal to be specified as a square-wave signal, saw-tooth signal, triangular signal or sinusoidal signal. This provides reliable differentiation from a driving signal, which could be added by a user through manipulation of the brake pedal.

Furthermore, during control by the autonomous driving system, it is preferable for the control via manipulation of the brake pedal to be detected, if the characteristic of the differential travel corresponds to the characteristic of the validation signal. If, when viewed over time, the variation of the differential travel corresponds or nearly corresponds to the variation of the validation signal, the validation signal is detected in the differential travel, and therefore, manipulation of the brake pedal is deduced.

A setpoint volumetric flow rate, a setpoint speed, a setpoint engine torque and/or a setpoint current is preferably selected as a validation signal. Thus, the validation signal and its validation may be introduced into the overall system in different ways.

A device in accordance with an example embodiment of the present invention includes a control unit, which, during normal use, is specially configured to implement and/or execute the method of the present invention. This yields the advantages already mentioned above.

A brake system in accordance with an example embodiment of the present invention, includes the device of the present invention.

A vehicle in accordance with an example embodiment of the present invention, in particular, motor vehicle, has the brake system of the present invention.

This yields the advantages already mentioned above. Further advantages and preferred features and combinations of features are derived, in particular, from what is disclosed herein.

Below, the present invention is explained in greater detail in light of the figures.

BRIEF DESCRIPTION OF THE DRAWINGS

FIG. 1 shows a simplified plan view of a motor vehicle.

DETAILED DESCRIPTION OF EXAMPLE EMBODIMENTS

Figure 2A:
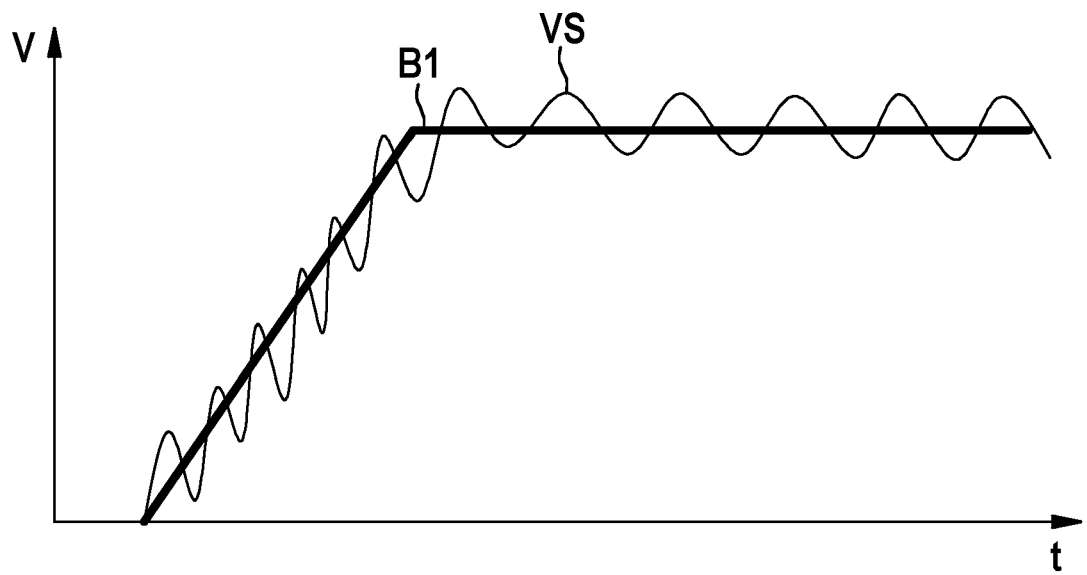
FIGS. 2A and 2B show graphs for explaining an advantageous method of operating a brake system of the motor vehicle, in accordance with an example embodiment of the present invention.

FIG. 1 shows a simplified plan view of a motor vehicle 1, which includes a brake system 2, as well as an autonomous driving system 3. Autonomous driving system 3 is configured to guide motor vehicle 1 fully autonomously to a destination as a function of the selected destination. In this context, driving system 3 is optionally connected to a surround-sensor system 4 that includes a plurality of surround sensors 5, such as radar, ultrasonic or laser sensors, which monitor the surrounding area of motor vehicle 1 for potential danger. If, for example, with the aid of surround-sensor system 4, driving system 3 determines that motor vehicle 1 is moving towards an object or a vehicle traveling ahead, at a speed, which could result in motor vehicle 1 crashing into the object, then driving system 3 is configured to trigger brake system 2 to initiate emergency braking for decelerating motor vehicle 1, through which the crash is intended to be prevented.

The brake system 2 at hand includes an electromechanical brake booster 6, which may be driven electrically to increase a hydraulic pressure in brake system 2, in order to provide an increased brake pressure and/or an increased braking force at wheel brakes 7. In this context, brake booster 6 is controlled as a function of manipulation of a brake pedal 8 by a driver of motor vehicle 1. Thus, brake booster 6 constitutes an actuator 9 for increasing the braking force.

Brake booster 6 is also connected to driving system 3 in a manner allowing transmission of signals, so that driving system 3 is also able to control brake booster 6, in order to be able to initiate or carry out, in particular, an autonomous braking action, as already explained above. The hydraulic pressure generated by brake booster 6 is then made available to one or more brake circuits represented in FIG. 1 in a simplified manner by a box 10. In this context, a control unit 11 of motor vehicle 1 monitors brake booster 6, as well as driving system 3 and brake pedal 8, in the manner described in the following, in order to check the plausibility of a request for emergency braking by driving system 3. If driving system 3 requests emergency braking by triggering actuator 6 to increase the braking force, then control unit 11 ensures that the control signal of driving system 3 is superimposed with a validation signal, which has a varying characteristic.

In this regard, FIG. 2A shows a simplified graph of the characteristic of validation signal VS across braking-request signal B1 of driving system 3. Validation signal VS is selected to be a signal having a sinusoidal characteristic. Alternatively, a square-wave characteristic, a saw-tooth characteristic, or a triangular characteristic of the validation signal is possible. Validation signal VS is such that, with regard to its dynamics, it may not be generated by a human driver via manipulation of the brake pedal. Due to the variation, the validation signal is superimposed on the actual request signal and results in a predefined brake value. In this context, the braking request is implemented, using a volumetric flow rate request of the driving system to electromechanical brake booster 6. Thus, validation signal VS relates to volumetric flow rate request V.

Figure 2B:
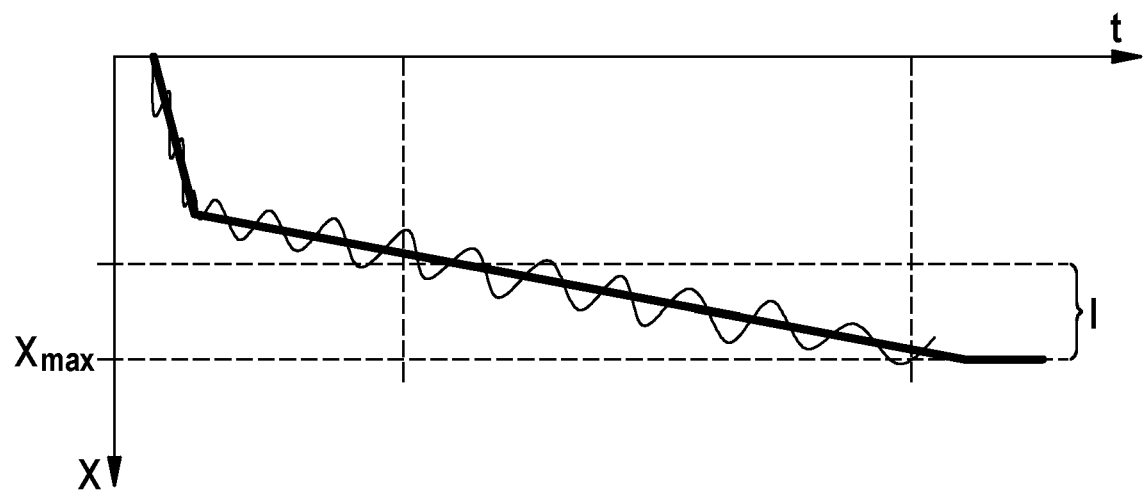

Brake pedal 8 is coupled to actuator 9 in such a manner, that in response to a request for an increased braking torque, an actuator element of actuator 9 drives brake pedal 8 at the presence of a predefined differential travel X, using a mechanical catch. In this connection, one speaks of a negative differential travel between the actuator element and the brake pedal. If a positive differential travel X, that is, greater than 0, is present, then, by manipulating the brake pedal, the driver is requesting a higher pressure than autonomous driving system 3, which results in the increased pressure request of the driver being implemented. If differential travel X indicates a value between the minimum value and 0, then it is inferred that the driver did manipulate the pedal, but that autonomous driving system 3 specifies the intensity of the braking. FIG. 2B shows differential travel X versus time t in accordance with the volumetric flow rate request shown in FIG. 2A.

For the case in which the pedal is manipulated by the driver, the characteristic curve of the validation signal may be detected in the differential travel (signal). As long as the mechanical catch ($x_{max}$) is not yet reached, the variation of the validation signal is detectable in the request and, therefore, in differential travel X. In this manner, the driver may even be detected in the case of low pedal forces on the brake pedal. Only when, in addition to the request by driving system 3, manipulation of brake pedal 8 is detected in the differential travel X via the determination of the characteristic curve of the validation signal, is the request for emergency braking by driving system 3 checked for plausibility and carried out. If the characteristic signal is added, then differential travel X is only consistently equal to a specified value, when the mechanical catch is already reached. In this case, the driver does not manipulate the pedal. In all other cases, manipulation of the brake pedal by the driver may be inferred unequivocally by evaluating the non-constant differential travel X, that is, non-uniform differential travel X. In particular, the sinusoidal characteristic of the validation signal is apparent in the differential travel, as is shown by a superposed sinusoidal curve in FIG. 2B. Thus, the manipulation of the driver may be deduced directly from the non-constant differential travel (signal). Noise of the signal is preferably taken into account and filtered, in order to prevent misinterpretation. Since the method is independent of mechanical tolerances, this increases the operative range of the detection of brake-pedal manipulation, as indicated by a range I in FIG. 2B.

What is claimed is:

1. A method for operating a brake system of a motor vehicle, the brake system including at least one electric actuator, which may be driven to generate a braking force, the at least one electric actuator being controllable by an autonomous driving system and as a function of manipulation of a brake pedal of the vehicle, the method comprising:
- superimposing a control signal of the at least one electric actuator from the autonomous driving system with a varying validation signal;
- monitoring a differential travel between an actuator element of the at least one electric actuator and the brake pedal;
- detecting a driving of the at least one electric actuator by brake-pedal manipulation during the control by the autonomous driving system when the differential travel varies; and
- initiating an emergency braking action when the at least one electric actuator is driven both by the autonomous driving system and by manipulation of the brake pedal.

2. The method as recited in claim 1, wherein the at least one electric actuator is a brake booster.

3. The method as recited in claim 1, wherein the validation signal is selected in such a manner that the validation signal differs from a time characteristic of manipulation of the brake pedal.

4. The method as recited in claim 1, wherein the validation signal is selected as a square-wave signal, or a sawtooth signal, or a triangular signal or a sinusoidal signal.

5. The method as recited in claim 1, wherein during the control of the at least one electric actuator by the autonomous driving system, the driving via manipulation of the brake pedal is detected when a characteristic of the differential travel to a characteristic of the validation signal.

6. The method as recited in claim 1, wherein a setpoint volumetric flow rate, or a setpoint speed, or a setpoint engine torque or a setpoint current is selected as the validation signal.

* * * * *